(12) United States Patent
Sawano

(10) Patent No.: US 7,716,600 B2
(45) Date of Patent: May 11, 2010

(54) INTERFACE

(75) Inventor: Takashi Sawano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 222 days.

(21) Appl. No.: 11/436,464

(22) Filed: May 17, 2006

(65) Prior Publication Data

US 2006/0277500 A1 Dec. 7, 2006

(30) Foreign Application Priority Data

May 19, 2005 (JP) ............................. 2005-146926

(51) Int. Cl.
*G06F 3/048* (2006.01)

(52) U.S. Cl. ...................... 715/813; 715/774; 715/810; 715/811; 715/828; 715/829; 715/830; 715/744; 715/745; 715/747; 715/779

(58) Field of Classification Search ................ 715/810, 715/811, 812, 813, 828, 829, 830, 744, 745, 715/747, 764, 774, 778, 779, 784, 785, 786, 715/787, 792
See application file for complete search history.

(56) References Cited

U.S. PATENT DOCUMENTS

| | | | | |
|---|---|---|---|---|
| 6,184,884 B1 * | 2/2001 | Nagahara et al. | ............. | 715/828 |
| 6,239,798 B1 * | 5/2001 | Ludolph et al. | ............. | 715/788 |
| 6,421,694 B1 * | 7/2002 | Nawaz et al. | ................ | 715/234 |
| 6,538,698 B1 * | 3/2003 | Anderson | .............. | 348/333.05 |
| 6,976,229 B1 * | 12/2005 | Balabanovic et al. | ....... | 715/838 |
| 7,152,210 B1 | 12/2006 | Van Den Hoven et al. | | |
| 2001/0019338 A1 * | 9/2001 | Roth | .......................... | 345/811 |
| 2003/0226152 A1 * | 12/2003 | Billmaier et al. | ............ | 725/135 |
| 2004/0090469 A1 | 5/2004 | Moon et al. | | |
| 2004/0155909 A1 * | 8/2004 | Wagner | ....................... | 345/854 |
| 2004/0212640 A1 * | 10/2004 | Mann et al. | .................. | 345/792 |
| 2004/0216036 A1 * | 10/2004 | Chu et al. | ................ | 715/501.1 |
| 2005/0039135 A1 * | 2/2005 | Othmer et al. | .............. | 715/774 |
| 2006/0087502 A1 * | 4/2006 | Karidis et al. | ................ | 345/211 |
| 2006/0161867 A1 * | 7/2006 | Drucker et al. | .............. | 715/810 |
| 2006/0218499 A1 * | 9/2006 | Matthews et al. | ........... | 715/765 |
| 2006/0248475 A1 * | 11/2006 | Abrahamsson | .............. | 715/835 |

FOREIGN PATENT DOCUMENTS

| | | |
|---|---|---|
| JP | 01-120595 | 5/1989 |
| JP | 03-214220 | 9/1991 |
| JP | 04-214595 | 8/1992 |
| JP | 11-102277 | 4/1999 |
| JP | 2000-305760 | 11/2000 |
| JP | 2002-182871 | 6/2002 |

* cited by examiner

*Primary Examiner*—Weilun Lo
*Assistant Examiner*—Rashedul Hassan
(74) *Attorney, Agent, or Firm*—David G. Conlin; Steven M. Jensen; Edwards Angell Palmer & Dodge LLP

(57) ABSTRACT

An interface for displaying icons or input control portions corresponding to a plurality of functions on screen and pointing each icon or input control portion on screen selectively includes display control means which, along with repeatedly changing and displaying the icons or the input control portions in succession on screen, designates at least one icon or input control portion among the icons or the input control portions and displays the designated icon(s) or input control portion(s) on a permanent basis.

10 Claims, 12 Drawing Sheets

| Identification Number | Display Region Data | Icon Image Information | Input Control Portion Image Information |
|---|---|---|---|
| 1000 | A | Color function a | Color function a |
| 1001 | A | Color function b | Color function b: U settings ▼ / V settings / W settings / X settings / Y settings / Z settings |
| ..... | ..... | ..... | |
| 1099 | A | Finishing function a | ☑ Finishing function z |

| Identification Number | Display Region Data | Icon Image Information | Input Control Portion Image Information |
|---|---|---|---|
| 1000 | B | Color function a | Color function a |
| 1001 | A | Color function b | Color function b: U settings ▼ / V settings / W settings / X settings / Y settings / Z settings |
| ..... | ..... | ..... | |
| 1099 | A | Finishing function a | ☑ Finishing function z |

FIG.12

| Identification Number | Display Region Data | Icon Image Information | Input Control Portion Image Information (D1A) | Frequency of Selection | Record of Date & Time of Selection |
|---|---|---|---|---|---|
| 1000 | A | Color function a | Color function a | 23 | 2005/1/3<br>2005/1/4<br>........<br>........<br>2005/2/23<br>2005/3/3 |
| 1001 | A | Color function b | Color function b:<br>U settings ▼<br>V settings<br>W settings<br>X settings<br>Y settings<br>Z settings | 30 | 2005/1/20<br>2005/2/1<br>........<br>........<br>2005/2/23<br>2005/3/1 |
| ..... | ..... | ..... | | | |
| 1099 | A | Finishing function a | ☑ Finishing function z | 40 | 2005/2/28<br>2005/3/1<br>........<br>........<br>2005/3/3<br>2005/3/3 |

| Identification Number | Display Region Data | Group Name | Icon Image Information | Input Control Portion Image Information |
|---|---|---|---|---|
| 1000 | A | Color functions | Color function a | ..... |
| 1001 | A | Color functions | Color function b | ..... |
| ..... | ..... | ..... | ..... | ..... |
| 1099 | A | Finishing functions | Finishing function a | ..... |

D1B

INTERFACE

BACKGROUND OF THE INVENTION

This application claims priority based on Patent Application No. 2005-146926 filed in Japan on May 19, 2005 under Article 119(a) of the U.S. Patent Act. Its entire contents are incorporated herein by reference.

The present invention relates to an interface for selectively pointing a plurality of icons, etc. on screen.

Conventional interfaces of this type include interfaces, in which a plurality of icons are arranged and displayed on the screen of a display device and the functions of application software etc. corresponding to the icons are activated, for instance, by selecting and pointing the desired icons with the help of a pointing device.

Incidentally, in case of a small screen, multiple icons had to be arranged without gaps, which caused icon visibility to deteriorate and made the operation of the icon selection more difficult.

For this reason, for instance, in Japanese Laid-Open Unexamined Patent Application Publication No. 2002-182871 (hereinafter called "Patent Document 1"), both icons and input control portions (buttons, check boxes, etc.) are displayed on screen, thereby efficiently utilizing screen real estate.

Moreover, in Japanese Laid-Open Unexamined Patent Application Publication No. H11-102277 (hereinafter called "Patent Document 2"), a polygon is displayed on screen, with at least one icon positioned on each side of the polygon and the polygon rotated through multiples of 90° by operating a pointing device to display the icons on each side of the polygon in succession, thereby achieving an improvement in terms of ease of use.

However, as described in Patent Document 1, when the number of icons or input control portions increased, the icons or the input control portions had to be reduced in size, which diminished their visibility and operability.

Moreover, because in Patent Document 2 the polygon was rotated through multiples of 90 degrees by operating a pointing device, viewing all the sides of the polygon required multiple operations. In addition, certain operations were required for returning to the desired side after viewing all the sides of the polygon. As a result, operating the pointing device was a complicated task.

Accordingly, the present invention was made with account taken of the problems that existed in the past, and it is an object of the invention to provide an interface which, while being simple to operate, makes it possible to successively display a plurality of icons etc. and to select and point the icons, etc.

SUMMARY OF THE INVENTION

In order to address the problem described above, an interface of the present invention, in which icons or input control portions corresponding to a plurality of functions are displayed on screen and each icon or input control portion is pointed on screen selectively, includes display control means which, along with repeatedly changing and displaying the icons or the input control portions on screen in succession, designates at least one icon or input control portion among the icons or the input control portions and displays the designated icon(s) or input control portion(s) on a permanent basis.

Because the interface of the present invention repeatedly changes and displays the icons or the input control portions in succession on screen, such an interface can present numerous icons or input control portions using little screen real estate. Moreover, although with such a repeated display alone, it is necessary to wait until frequently used the icons or the input control portions are displayed in the course of such repeated display, designating frequently used the icons or the input control portions and displaying them on a permanent basis allows for selecting and pointing frequently used the icons or the input control portions at any time and eliminates the need to wait.

It should be noted that the input control portions are specifically exemplified by character strings, symbols, etc. operated by clicking with a pointing device etc., or buttons and check boxes manipulated on screen, and that they are associated with functions in the same manner as icons.

Moreover, the icons or the input control portions repeatedly changed and displayed in succession may include the designated icons or input control portions displayed on a permanent basis.

Because in such a case the icons or the input control portions repeatedly changed and displayed in succession include the permanently displayed designated icons or input control portions, the interface can be provided to any of a plurality of users under the same conditions, thereby improving operability. For instance, it can be effective when a plurality of users share a personal computer.

Moreover, the present invention may include selection means for selectively setting up the permanently-displayed designated icons or input control portions among the icons or the input control portions repeatedly changed and displayed in succession.

Because in such a case the permanently displayed designated icons or input control portions are selectively set up among the icons or the input control portions repeatedly changed and displayed in succession, the icons or the input control portions preferred by the users can be designated and displayed on a permanent basis.

In addition, the present invention may include storage means for storing, for each displayed icon or input control portion, the frequency of selection obtained when the icon or the input control portion is selected and pointed for the purpose of activating a function, and the display control means may select the permanently displayed designated icons or input control portions based on the frequency of selection of the icons or the input control portions stored in the storage means.

In the configuration described above, the permanently-displayed designated icons or input control portions are selected based on the frequency of selection of the icons or the input control portions. Because in such a case frequently used the icons or the input control portions are selected and displayed as designated items (the icons or the input control portions) automatically, the need for selection operations by users is eliminated and operability is improved.

In addition, the present invention may include number entry means for entering and pointing the number of permanently displayed designated icons or input control portions and the display control means may permanently display a number of designated icons or input control portions based on the number entered and pointed by the number entry means.

Because in such a case the number of permanently displayed designated icons or input control portions is based on the entered and pointed number, an appropriate number of icons or input control portions can be designated and permanently displayed, thereby improving visibility and operability. If the number of designated icons or input control portions is fixed, then a high number of frequently used the icons or the input control portions may prevent some icons or input control portions from being displayed as designated items despite their high frequency of use and users may have to wait until such the icons or the input control portions are displayed in the course of repeated display. In addition, if the number of frequently used the icons or the input control portions is low, the number of icons or input control portions displayed as designated items will grow excessively large and screen display will become more complex, thereby reducing visibility and operability.

In addition, the present invention may include storage means for storing, for each icon or input control portion, the frequency of selection and the date and time of selection obtained when the icons or the input control portions are selected and pointed in order to activate a function, and the display control means may, by using the frequency of selection and the date and time of selection of the icons or the input control portions stored in the storage means, designate a date and time to obtain the frequency of selection after the designated date and time for each icon or input control portion, and select a permanently displayed designated icon or input control portion based on the frequency of selection of the icons or the input control portions after the designated date and time.

In such a case, the influence of past frequencies of selection obtained over extended periods of time can be avoided because the frequency of selection after a designated date and time is obtained for each icon or input control portion and the permanently displayed designated icons or input control portions are selected based on the frequency of selection after the designated date and time, i.e. based on a recent selection frequency. As a result, even in case of recent changes in the frequency of use of the icons or the input control portions, the permanently displayed icons or input control portions are the recent ones with high frequency of use, which improves operability.

Furthermore, the present invention may include date/time entry means for entering a designated date and time.

In such a case, in case of fast changes in the frequency of use of the icons or the input control portions, the entry of the designated date and time allows for the permanently displayed designated icons or input control portions to be appropriately selected by setting a recent date and time as the designated date and time. Conversely, in case of slow changes in the frequency of use of the icons or the input control portions, the permanently displayed designated icons or input control portions can be appropriately selected by setting an earlier date and time as the designated date and time.

In addition, the present invention may include storage means for storing the designated icons or input control portions in association with user information and the display control means may acquire user information, read an icon or an input control portion corresponding to the acquired user information as a designated icon or input control portion from the storage means, and display the read-out designated icon or input control portion on a permanent basis.

Because in such a case the designated icons or input control portions are stored in association with user information and permanent display is provided by acquiring user information and reading the designated icons or input control portions corresponding to the acquired user information, the designated icons or input control portions can be set up separately for each user, thereby improving operability.

In addition, the present invention may include storage means for storing the icons or the input control portions grouped and the display control means may read out the icons or the input control portions corresponding to entered and pointed groups from the storage means and repeatedly change and display the read-out icons or input control portions in succession.

Because in such a case the icons or the input control portions are divided into groups and the icons or the input control portions corresponding to entered and pointed groups are read out and then changed and displayed in a successive repeated manner, the period of the icon display is shortened and the wait time required until the desired icons are displayed is made shorter as well.

In addition, in the present invention, the icons or the input control portions may be moving images.

Because in such a case the icons or the input control portions are moving images, the functions of the icons can be presented in an easily understandable form.

BRIEF DESCRIPTION OF THE DRAWINGS

FIG. 12 is a diagram illustrating an example of modification of the data table of FIG. 5.

DESCRIPTION OF THE PREFERRED EMBODIMENTS

Below, the embodiments of the present invention are explained in detail by referring to the accompanying drawings.

Figure 1:
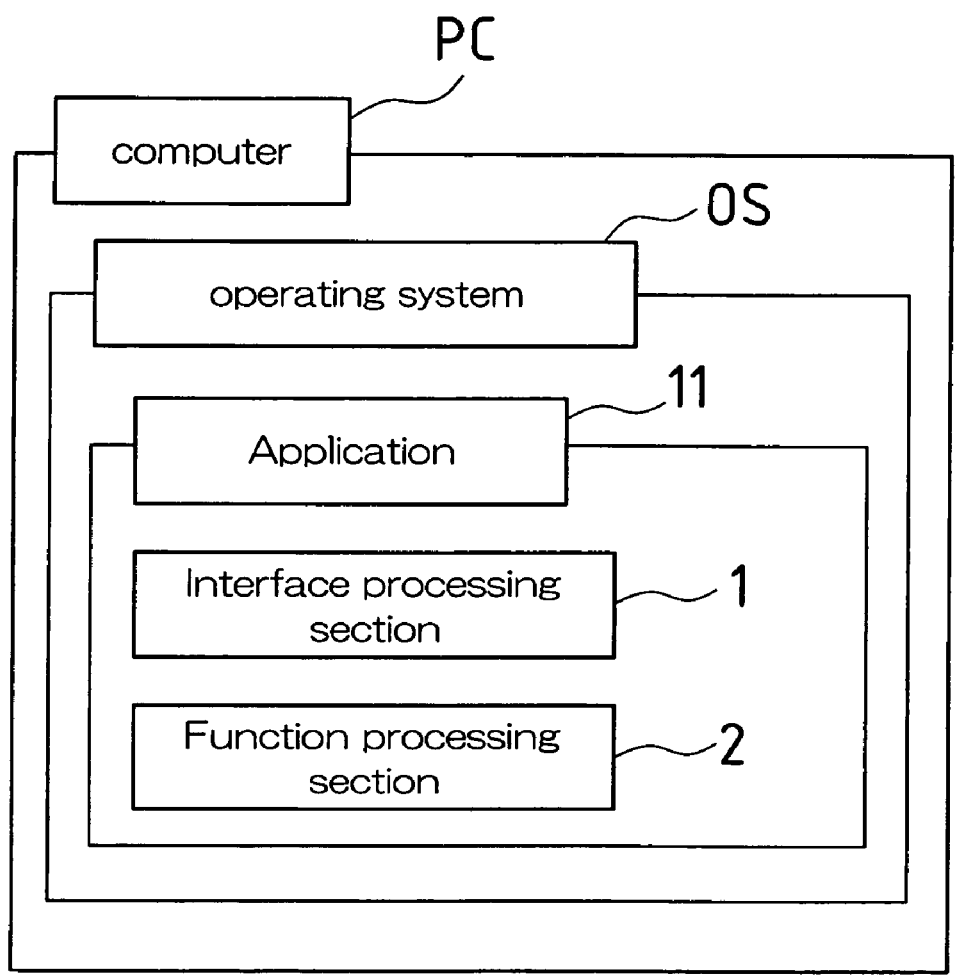
FIG. 1 is a block diagram illustrating an embodiment of the interface of the present invention.

FIG. 1 is a block diagram illustrating an embodiment of the interface of the present invention. The interface of the present embodiment is constructed by executing application software 11 comprising an interface processing section 1 and a function processing section 2, which implements various functions, based e.g. on an Operating System (hereinafter it is called "OS") of a Personal Computer (hereinafter it is called "PC") etc. and operating liquid crystal display units and other display devices, mouse devices and other pointing devices, and printers and other peripheral devices.

Figure 2:
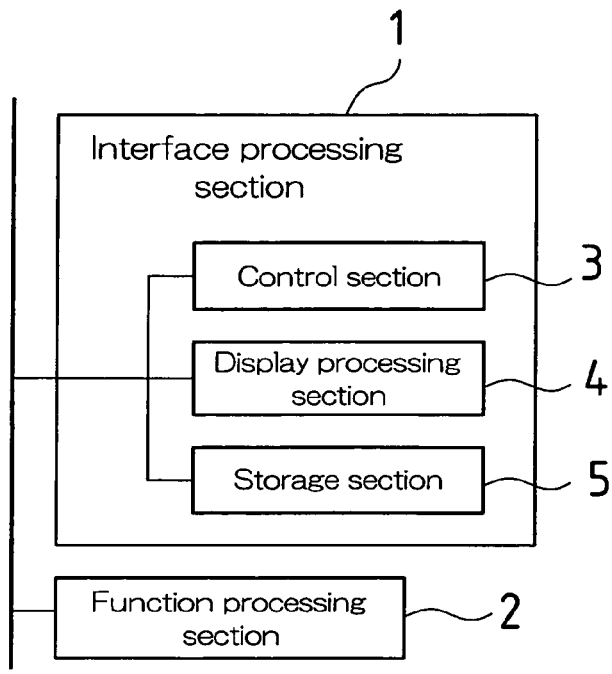
FIG. 2 is a functional block diagram illustrating the configuration of the application used in the present embodiment.

FIG. 2 is a functional block diagram illustrating the configuration of the application software 11 (application 11 shown in FIG. 2). The interface processing section 1 includes a control section 3, which controls the user interface displayed on the screen of the display device, a display processing section 4, which operates the interface UI on screen in response to instructions from the control section 3, and a storage section 5, which exercises control over the storage of different kinds of information etc. necessary for displaying the interface UI.

The function processing section 2 exercises overall control over the application software 11. For instance, it receives events from peripheral devices 12 through the OS, transmits the events to the control section 3 of the interface processing section 1, receives information from the control section 3 and transmits the information to the peripheral devices through the OS.

Figure 3:
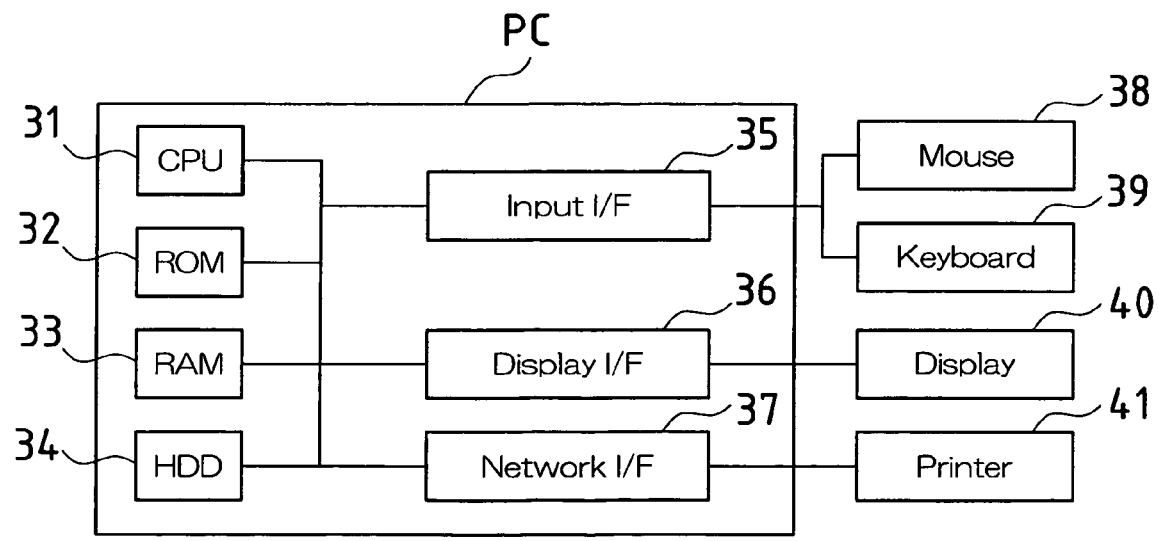
FIG. 3 is a block diagram illustrating a personal computer, a printer, etc. used in constructing the interface of the present embodiment.

FIG. 3 is a block diagram illustrating a PC, a printer, etc. used in constructing the interface of the present embodiment. The PC includes a CPU (central processing unit) 31, which exercises centralized control over the PC, a ROM 32, which is used to store various programs, data, etc., a RAM 33, which is used as a work area temporarily storing various data, an HDD (hard disk device) 34, which is used to store various programs, data, etc, a network interface section 37, which is connected to a printer 41 through a network, a display interface section 36, which is connected to a display 40, and an input interface section 35, which is connected to a keyboard 39, a pointing device (e.g. a mouse) 38, etc.

The CPU 31 reads the OS, the application software 11, etc. from the HDD 34, executes the application software 11 in the above-described manner based on the OS, controls the printer 41 via the network interface section 37, exercises display control over the display 40 via the display interface section 36, and uses the input interface section 35 for inputting instructions and data from the keyboard 39 and pointing devices 38 etc., thereby constructing the interface processing section 1. Therefore, the CPU 31 embodies the functions of the OS, the application software 11, etc.

Figures 4, 5:
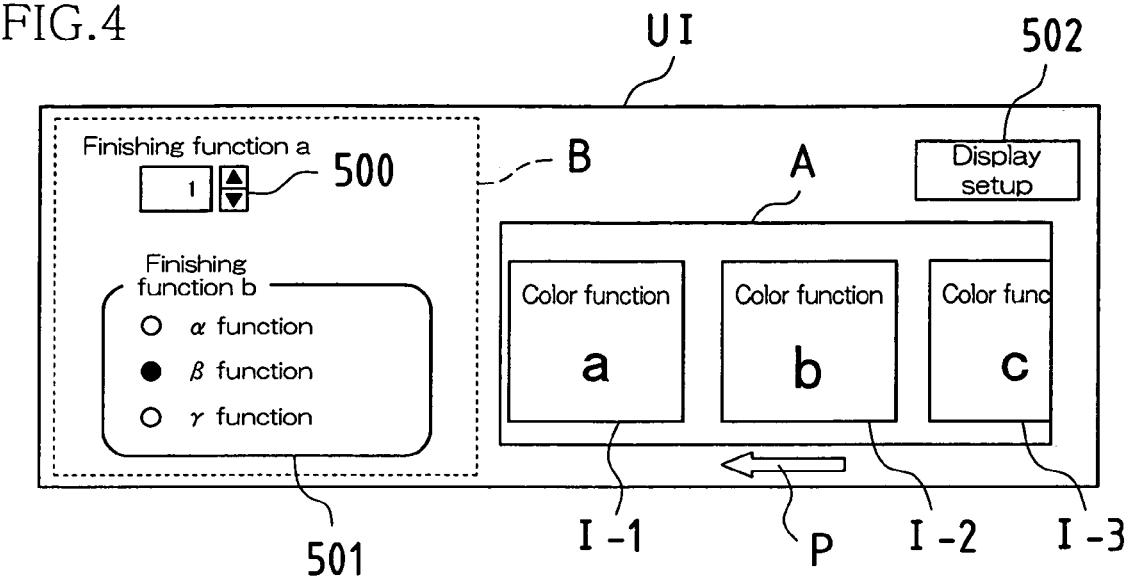
FIG. 4 is a diagram illustrating an example of the interface UI used for displaying icons and input control portions in the present embodiment.
FIG. 5 is a diagram illustrating an example of the data table used for displaying the interface UI in the present embodiment.

FIG. 4 illustrates an example of the interface UI displayed on the screen of the display 40 by the interface processing section 1. The interface UI has a display region A used for displaying a plurality of icons in motion and a display region B used for displaying standard input control portions used in software on a permanent basis.

The input control portions, which include character strings, symbols, and the like operated by clicking with a pointing device etc. or buttons, check boxes, and lists etc. manipulated on screen, are associated with functions in the same manner as icons.

A plurality of icons I-1, I-2, . . . , which are arranged and displayed in the display region A, are caused to move in the direction of arrow P on screen. As the icons I-1, I-2 . . . move in the direction of arrow P, they are endlessly repeatedly displayed in succession at constant intervals. For this reason, even if the display region A is small, it still allows for presenting a large number of icons. When icons associated with the desired functions are displayed in the display region A, the user can select and point the icons by placing an on-screen cursor (not shown) over them with the help of the pointing device 38 and clicking the pointing device 38. This makes it possible to, for example, activate or select the functions of the application software 11, etc.

In addition, predetermined designated input control portions 500, 501 are displayed in the display region B. The user can make selections or activate, for example, the functions of application software 11 etc. by placing an on-screen cursor (not shown) over the input control portions 500, 501 associated with the desired functions with the help of the pointing device 38 and clicking the pointing device 38.

As a result, a large number of icons can be presented in the display region A and the desired input control portions can be directly selected in the display region B.

To display such display regions A, B on the screen of the display 40, the HDD 34 maintains a data table D1 used for storing information related to the icons and the input control portions illustrated in FIG. 5.

The data table D1 of FIG. 5 stores, in a correlated form, identification numbers describing the functions of the application software 11 etc.; display region data describing any of the display regions A, B; the image data (image information) of the icons displayed in the display region A; and the image data (image information) of the input control portions displayed in display region B.

When the interface UI of FIG. 4 is displayed, the application software 11 calls the control section 3 of the interface processing section 1 and the control section 3 initiates the processing of the display of the interface UI. The control section 3 consults the data table D1 in the HDD 34 via the storage section 5, searches the display region B of the display region data, reads out image data related to the input control portions corresponding to the display region B, and supplies the image data of the input control portions to the display processing section 4. Upon receipt of the image data of the input control portions, the display processing section 4 displays the display region B on screen and displays the input control portions in the display region B of the screen. At such time, if the display region data contain image data for a plurality of input control portions corresponding to the display region B, such the input control portions are displayed in the display region B of the screen. In addition, the control section 3 consults the data table D1, searches the display region A of the display region data, reads out image data related to a plurality of icons corresponding to the display region A, and supplies the image data of these icons to the display processing section 4. Upon receipt of the image data of these icons, the display processing section 4 displays the display region A on screen and displays these icons in the display region A of the screen. At such time, as described above, the display control section 4 causes the multiple icons to move in the direction of arrow P and endlessly repeatedly displays the icons in succession at constant intervals.

Next, the display control exercised by the application software 11 over the interface UI will be explained by referring to the flow chart of FIG. 6.

First of all, as explained above, when the application software 11 calls the control section 3 of the interface processing section 1, the control section 3 consults the data table D1 in the HDD 34 via the storage section 5, searches the display region B of the display region data, reads out image data related to the input control portions corresponding to the display region B, and supplies the image data of the input control portions to the display processing section 4. In addition, the control section 3 consults the data table D1, searches the display region A of the display region data, reads out image data related to a plurality of icons corresponding to the display region A, and supplies the image data of these icons to the display processing section 4 (Step S280).

Upon receipt of the image data of the input control portions, the display processing section 4 displays the display region B on screen and displays the input control portions in the display region B of the screen. In addition, upon receipt of the image data of the icons, the display processing section 4 displays the display region A on screen and displays these icons in the display region A of the screen (Step S281). At such time, the display processing section 4 displays the icons in motion in the direction of arrow P (Step S282). As a result, the interface UI of FIG. 4 is displayed on the screen of the display 40.

When the display regions A, B are displayed in this manner, the system waits for an input operation (operational event) to be performed via an icon or an input control portion by the pointing device 38, etc. (Step S283). Then, after an input operation performed via an icon or an input control portion ("Yes" in Step S283), the display processing section 4 informs the control section 3 of the icon or the input control portion, through which the input operation has been performed. After being informed of the icon or the input control portion used to perform the input operation, the control section 3 informs the function processing section 2 of the functions of the icon or the input control portion used to perform the input operation. By using the OS, the function processing section 2 exercises activation control over the functions corresponding to the icon or the input control portion used to perform the input operation, thereby performing the functions of the application software 11 (Step S284).

For instance, if the function corresponding to the icon or the input control portion used to perform the input operation is the driver of the printer 41, then the driver of the printer 41 is activated and the printer 41 is controlled by the driver such that printing is carried out.

Figure 6:
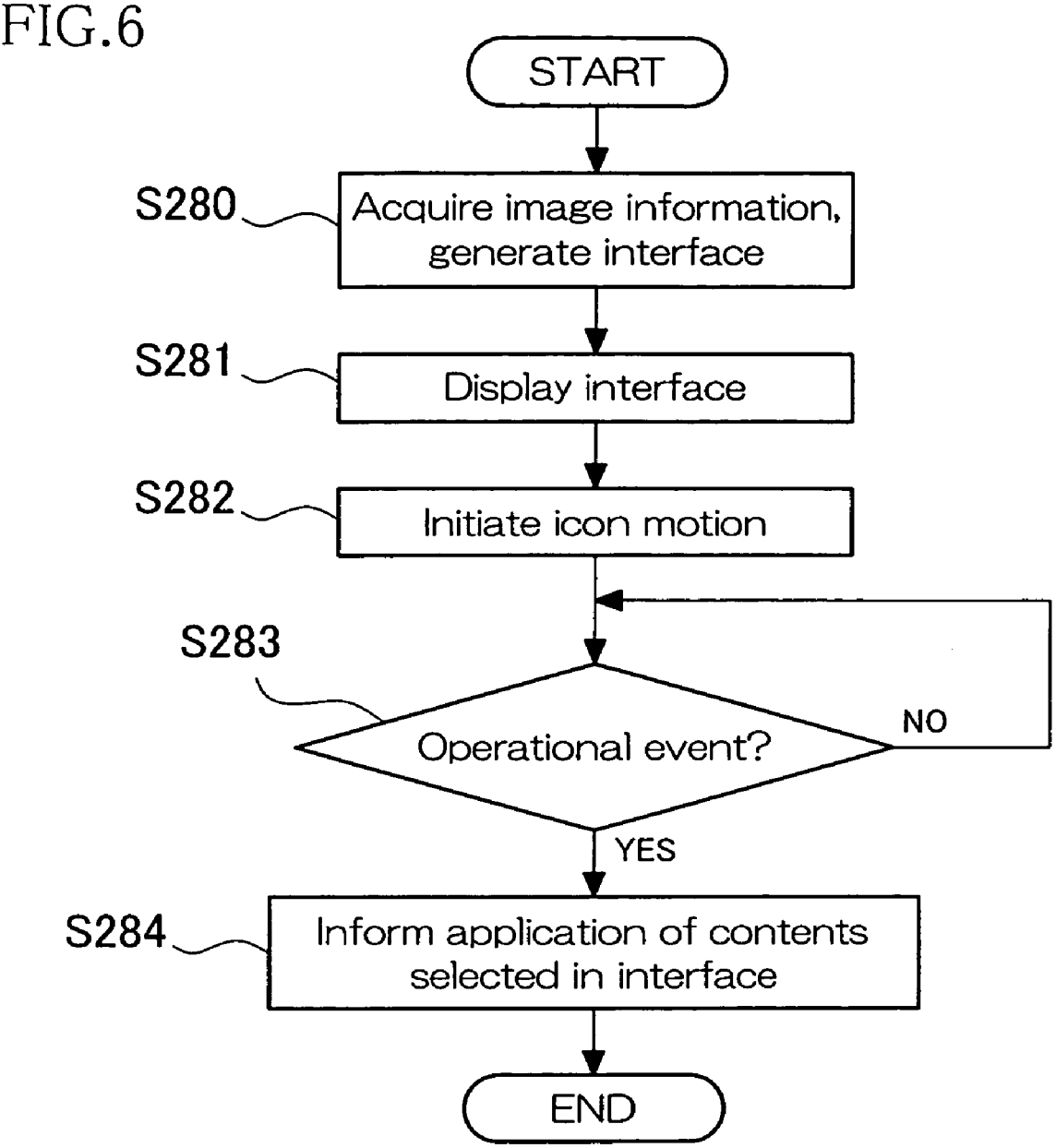
FIG. 6 is a flow chart illustrating application-based display control in the present embodiment.
Figure 7:
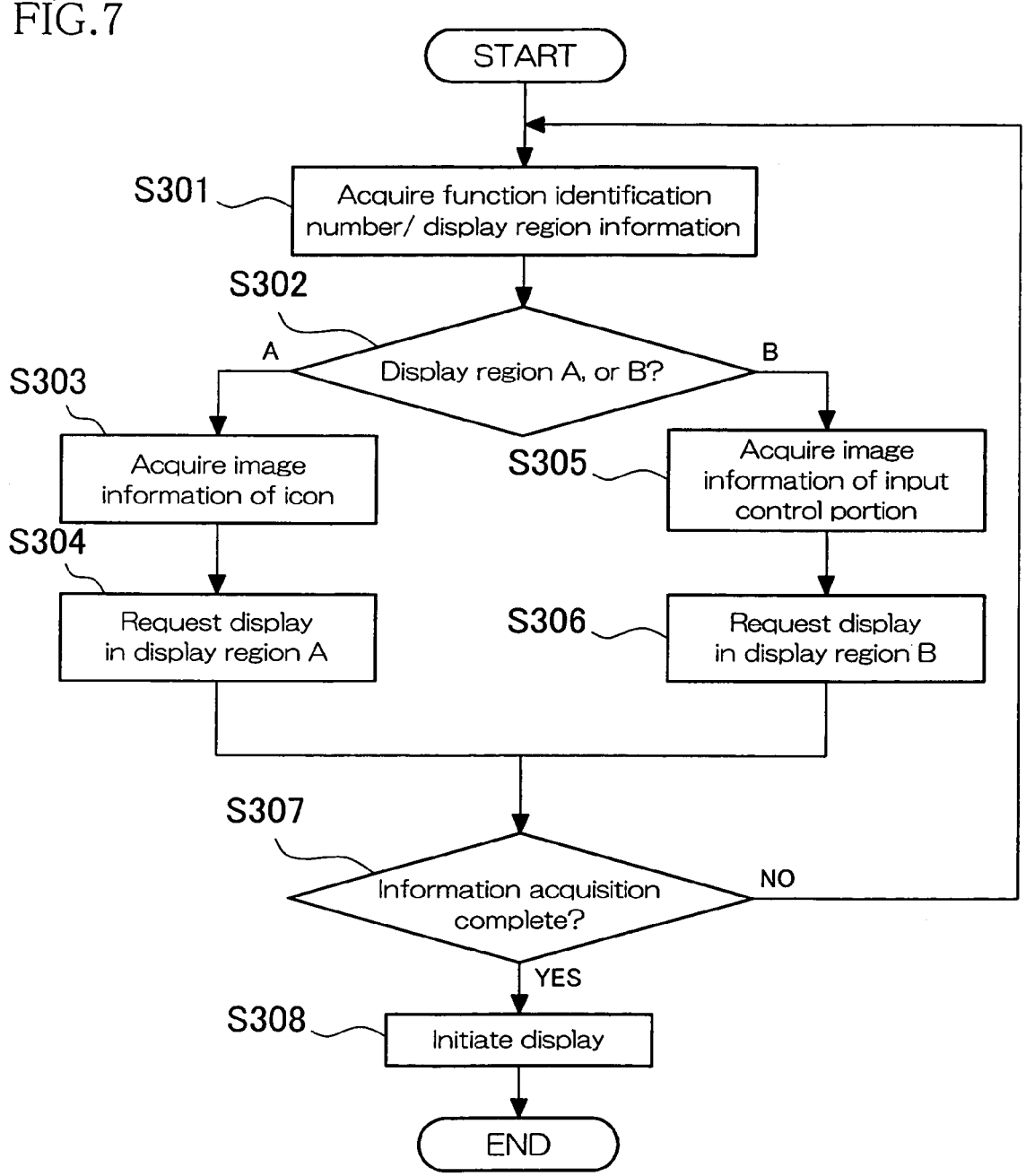
FIG. 7 is a flow chart illustrating the processing of Step S280 of FIG. 6 in greater detail.

Next, the processing of Step S280 of FIG. 6 is explained in greater detail by referring to the flow chart of FIG. 7.

When the control section 3 of the interface processing section 1 is called by the application software 11, the control section 3 consults the data table D1 in the HDD 34 via the storage section 5 and acquires display region data and identification numbers from the data table D1 (Step S301). The control section 3 then analyzes the acquired display region data and, if the display region data describe the display region A ("A" in Step S302), consults the data table D1 and acquires the image data of the icons corresponding to the acquired identification numbers (Step S303). Furthermore, the control section 3 supplies the acquired image data of the icons to the display processing section 4 and requests that the image data of the icons be displayed in the display region A of the screen (Step S304). Subsequently, the control section 3 decides whether the acquisition of display region data and identification numbers from the data table D1 is complete or not (Step S307) and, if it is not over ("No" in Step S307), returns to processing steps starting from Step S301.

In addition, the control section 3 analyzes the acquired display region data and, if the display region data describe the display region B ("B" in Step S302), consults the data table D1 and acquires the image data of the input control portions corresponding to the acquired identification numbers (Step S305). Furthermore, the control section 3 supplies the acquired image data of the input control portions to the display processing section 4 and requests that the image data of the input control portions be displayed in the display region B of the screen (Step S306). Then, if the acquisition of the display region data and identification numbers from the data table D1 is not over ("No" in Step S307), the control section 3 returns to processing steps starting from Step S301.

Subsequently, the processing that starts from Step S301 is repeated in a similar way until the acquisition of all the display region data and identification numbers from data table D1 is over. As a result, all of the image data of the icons of the display region A stored in the data table D1 are supplied to the display processing section 4 and all of the image data of the input control portions of the display region B stored in the data table D1 are supplied to the display processing section 4.

At such time, the control section 3 decides that the acquisition of display region data and identification numbers from the data table D1 is over ("Yes" in Step S307) and instructs the display processing section 4 to display the display region A along with the icons and display region B along with the input control portions (Step S308). In response, the display processing section 4 displays the interface UI of FIG. 4 on the screen of the display 40.

The modification of the display region data of the data table D1 is explained next. The display region data of the data table D1 can be modified according to a predetermined procedure. By doing so, icons displayed in the display region A of the screen can be deleted and, instead of them, the input control portions associated with the same functions as the icons can be displayed in the display region B of the screen, and, conversely, the input control portions displayed in the display region B of the screen can be deleted and, instead of them, icons associated with the same functions as the input control portions can be displayed in the display region A of the screen. Otherwise, both icons and input control portions associated with the same functions can be displayed in the display regions A and B.

Figure 8:
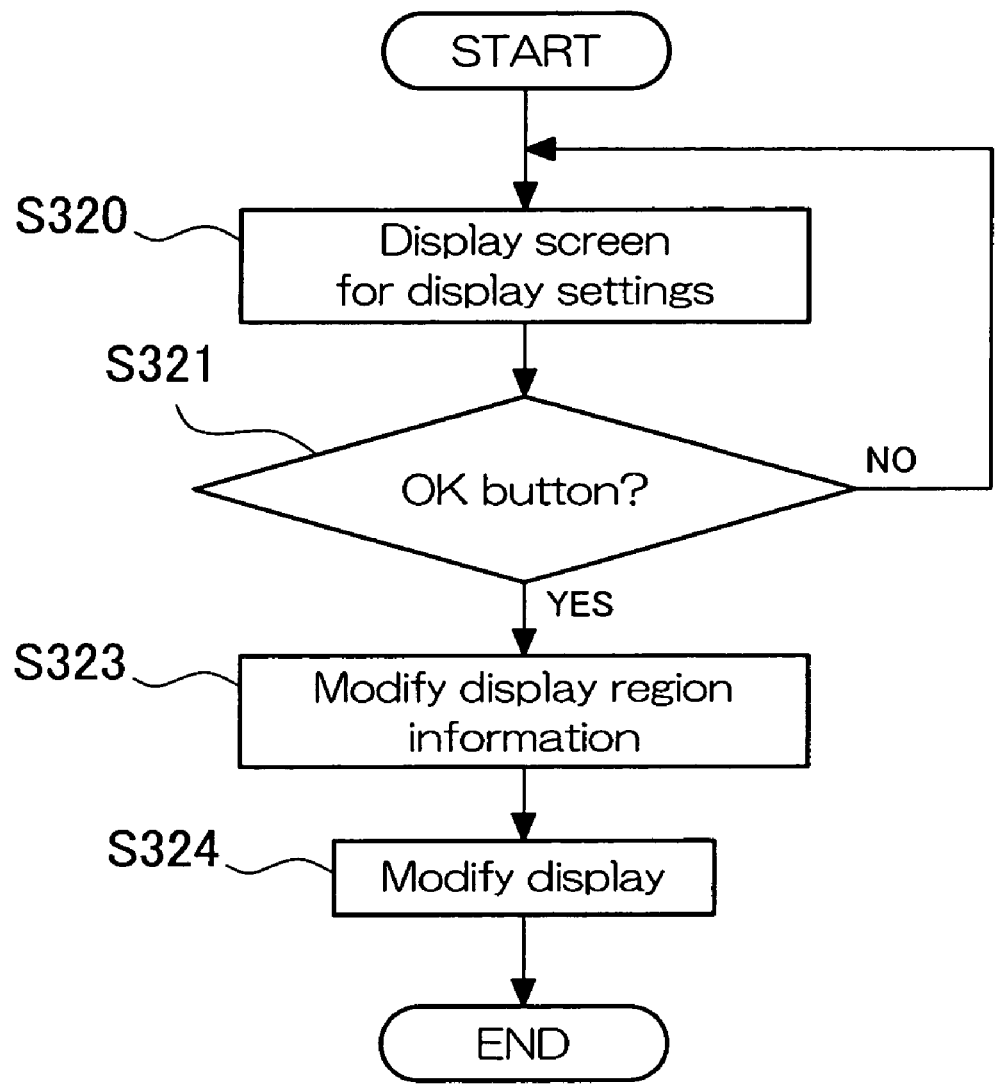
FIG. 8 is a flow chart illustrating the process of modification of the display region data of the data table of FIG. 5.
Figure 9:
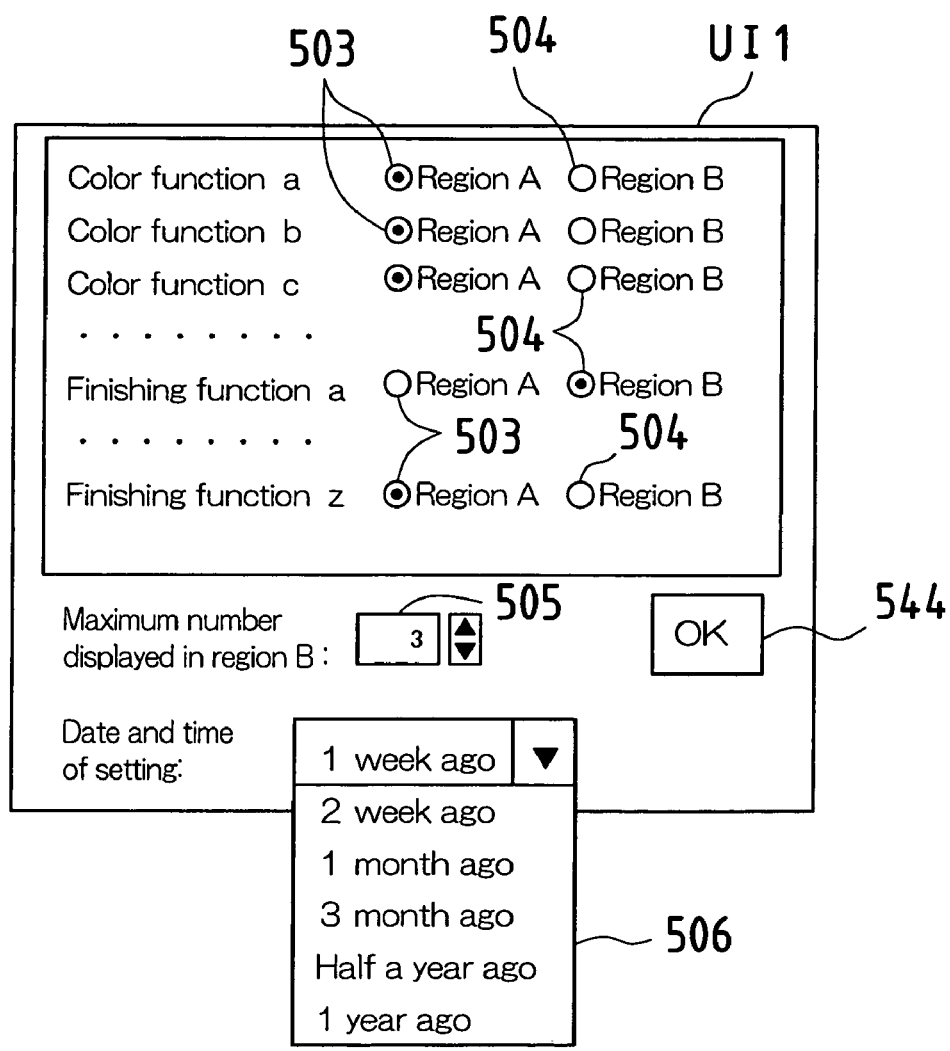
FIG. 9 is a diagram illustrating an example of the interface UI1 used for modifying the display region data of the data table of FIG. 5.

FIG. 8 is a flow chart illustrating the process of modification of the display region data of the data table D1. It is assumed that at the beginning of the process of modification of the display data, the interface UI of FIG. 4 is already displayed on the screen of the display device 40. In such a case, when display setup button 502 of the interface UI is selected and pointed by an input operation performed with the help of the pointing device 38, the control section 3 consults the data table D1 in the HDD 34 via the storage section 5, acquires all the identification numbers, display region data, image data of icon, and image data of input control portion, and supplies them to the display processing section 4. Upon receipt of all the identification numbers, display region data, image data of icon, and image data of input control portion, an interface UI1, such as the one shown in FIG. 9, is displayed on screen by the display processing section 4 (Step S320).

For each name of a function corresponding to an identification number, the interface UI1 displays, in a correlated form, a function name, a checkbox 503 of the display region A, and a checkbox 504 of the display region B. Then, if the display region data corresponding to the identification number in the data table D1 describe the display region A, the checkbox 503 of the display region A corresponding to the name of the function related to the identification number is selected and displayed (black dot) in the interface UI1, and if the display region data corresponding to the identification number in the data table D1 describe the display region B, the checkbox 504 of the display region B corresponding to the name of the function related to the identification number is selected and displayed (black dot) in the interface UI1. Therefore, the selection and display of the checkboxes 503, 504 corresponding to the name of the function related to the identification number is performed in accordance with the display region data corresponding to the same identification number.

After displaying the interface UI1, the display and selection of the checkboxes 503, 504 can be appropriately modified for each function name via input operations using the pointing device 38. Then, if the OK button 544 of the interface UI1 has not been activated by an input operation of the pointing device 38 ("No" in Step S321), modifications to the selection and display of the checkboxes 503, 504 can be repeated (Step S320).

If the OK button 544 of the interface UI1 has been operated ("Yes" in Step S321), the display processing section 4 responds by informing the control section 3 of how the checkboxes 503, 504 are selected and displayed and of the name of the function in the interface UI1 (Step S323). After being informed of how the checkboxes 503, 504 are selected and displayed and of the name of the function in the interface UI1, the control section 3 reflects the data in the data table D1 and updates the data table D1 (Step S324). Namely, if the selection and display of the checkboxes 503, 504 corresponding to the name of a function in the interface UI1 are modified, the display region data corresponding to the identification number of that function in the data table D1 is modified. For instance, if the selection and display are changed from the checkbox 503 of the display region A to the checkbox 504 of the display region B, the display region data is changed from "display region A" to "display region B". In addition, if the selection and display are changed from the checkbox 504 of the display region B to the checkbox 503 of the display region A, the display region data is changed from "display region B" to "display region A".

Upon updating the data table D1 in this manner, the control section 3 and display processing section 4 consult the updated data table D1 to display an updated interface UI.

Figures 10, 11:
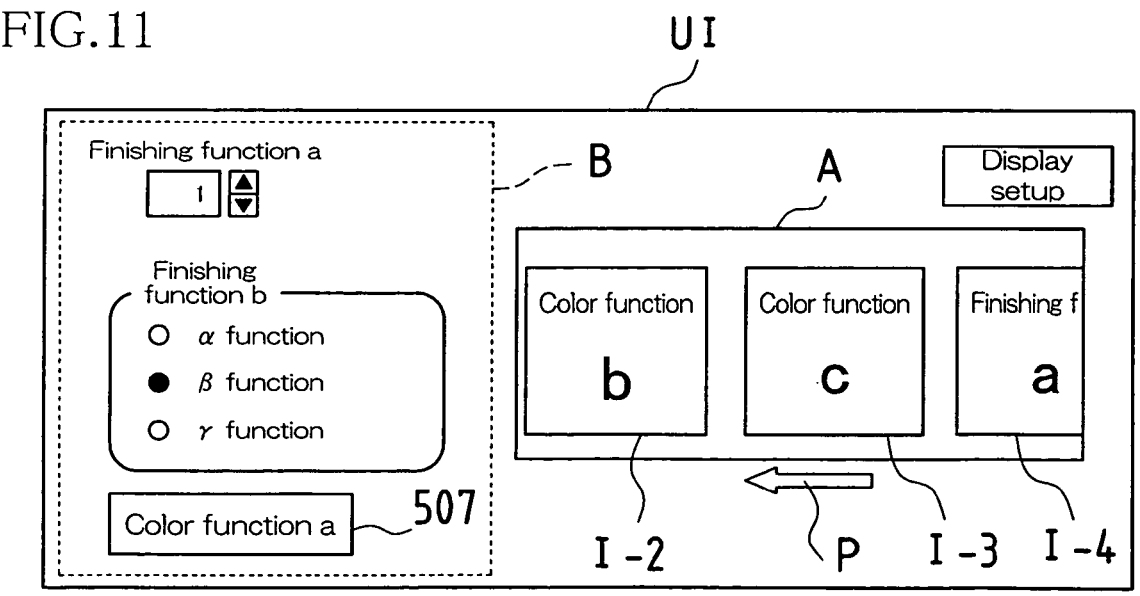
FIG. 10 is a diagram illustrating an example of updating the data table of FIG. 5.
FIG. 11 is a diagram illustrating the interface UI used for displaying icons and input control portions displayed based on the data table of FIG. 10.

For instance, the interface UI of FIG. 4 is displayed based on the data table D1 of FIG. 5 and when display region data corresponding to the identification number "1000" in the data table D1 of FIG. 5 is modified from "display region A" to "display region B", the data table D1 is updated as shown in FIG. 10. Because in such a case the display region data corresponding to the identification number "1000" in the data table D1 of FIG. 10 is "display region B", as shown in FIG. 11, icon I-1 corresponding to the identification number "1000" is deleted in the display region A and an input control portion 507 corresponding to the identification number "1000" is added in the display region B of the interface UI.

It should be noted that checkboxes 503, 504 corresponding to names with the same functions may be simultaneously selected and displayed, and display regions A and B can be simultaneously set up in the display region data of the data table D1. In such a case, the icons or the input control portions are displayed in any one of the display regions A and B. In the flow chart of FIG. 7, in step S302, it is determined that the display region data describes both display region A and display region B and steps S303, S304, which are used for displaying icons in the display region A of the screen, are carried out in parallel to steps S305, S306, which are used for displaying the input control portions in the display region B of the screen.

Incidentally, in the interface of the present embodiment, if no frequently used the input control portions are displayed in the display region B of the screen, it is necessary either to halt operation until icons associated with the same functions as the input control portions are displayed in the display region A and these icons are selected and pointed in the display region A, or to subject the display region data of the data table D1 of FIG. 8 to modification processing to change the display region data corresponding to the functions of the icons in the data table D1 from "display region A" to "display region B", display the input control portions associated with the same functionality as the icons in the display region B of the screen and then select and activate the input control portions in the display region B. Therefore, if no frequently used the input control portions are displayed in the display region B of the screen, time is lost because of the need to wait for icons and rewrite the data table D1.

Accordingly, each function can be assigned a frequency of use and the input control portions associated with frequently used functions can be automatically displayed in the display region B of the screen. In such a case, a data table D1A, e.g. such as the one illustrated in FIG. 12, is used instead of the data table D1 of FIG. 5. In the same manner as the data table D1, the data table D1A stores, in a correlated form, identification numbers, display region data, image data of icon, and image data of input control portion, and, in addition, stores the frequency of selection of the icons and the input control portions (the frequency of use of functions corresponding to the icons and the input control portions) and a record of the date and time of selection associated therewith.

As described above, when the interface UI is displayed and an input operation is performed via an icon or an input control portion with the help of the pointing device 38, the icon or the input control portion is reported by the display processing section 4 to the control section 3 and the functions corresponding to the icon or the input control portion are reported by the control section 3 to the function processing section 2. At such time, the control section 3 consults the data table D1A in the HDD 34 via the storage section 5, updates the selection frequency corresponding to the icon or the input control portion by adding "1" to the selection frequency, obtains the current date and time from the OS etc., and stores the date and time as a selection date and time associated with the icon or the input control portion. By doing so, the selection frequency and the dates and times of selection for the selection frequency are written to the data table D1A.

In addition, when the display of the interface UI begins, the control section 3 acquires the current date and time from the OS etc. and obtains a designated date and time preceding the current date and time by a predetermined designated period. The control section 3 then consults the data table D1A and, for each identification number, deletes all the dates and times of selection prior to the designated date and time among the dates and times of selection corresponding to the identification number, reduces the frequency of selection by the number of deleted dates and times of selection, and updates the record of the frequency of selection and dates and times of selection. This makes it possible to leave only the dates and times of selection after the designated date and time and to obtain and record the frequency of selection of the icons or the input control portions after the designated date and time.

Furthermore, the control section 3 compares the respective selection frequencies corresponding to all the identification numbers and selects, for instance, selection frequencies ranging from the top one to the third from the top, sets the display region data corresponding to the selected three selection frequencies in the display region B, and sets all of the other display region data in the display region A.

As a result, only the respective display region data corresponding to the three icons or input control portions with high selection frequencies after the designated date and time are set in the display region B.

Upon updating the display region data in the data table D1A in this manner, the control section 3 consults the data table D1A, searches the display region B of the display region data, reads out the image data of the respective three input control portions corresponding to the display region B, and displays these input control portions in the display region B of the screen via the display processing section 4. In addition, the control section 3 consults the data table D1, searches the display region A of the display region data, reads out image data related to a plurality of icons corresponding to the display region A, and displays these icons in the display region A of the screen via the display processing section 4.

Since only the respective display region data corresponding to the three icons or input control portions with high frequencies of selection after the designated date and time are set in the display region B, even if the frequency of use of the icons or the input control portions changes, only the input control portions with recently increased frequencies of use will be displayed in the display region B of the screen, thereby avoiding the influence of past selection frequencies obtained over extended periods of time and improving operability.

It should be noted that an entry box 505 may be displayed in the interface UI1 of FIG. 9 to permit entry of the number of icons to be displayed in the display region B in the entry box 505 by performing input operations using the pointing device 38. The control section 3 consults the data table D1A and displays only the corresponding number of input control portions in the display region B of the screen. This permits display of these input control portions in the display region B of the screen regardless of the actual number of input control portions with high frequencies of use.

In addition, an entry box 506 may be displayed in the interface UI1 of FIG. 9 to permit entry of a designated period in the entry box 506 by performing input operations using the pointing device 38. The control section 3 obtains a designated date and time preceding the current date and time by the designated period and displays several input control portions with high selection frequencies after the designated date and time in the display region B of the screen. For instance, in case of fast changes in the frequency of use of the icons or the input control portions, the permanently displayed designated icons or input control portions can be appropriately selected by setting a more recent date and time as the designated date and time. Conversely, in case of slow changes in the frequency of use of the icons or the input control portions, the permanently displayed designated icons or input control portions can be appropriately selected by setting an earlier date and time as the designated date and time.

Furthermore, the records of the date and time of selection in the data table D1A may be omitted, and recording may be limited to the frequency of selection. In such a case, the frequency of selection is recorded from the very beginning of use of the interface UI and the icons or the input control portions displayed in the display region B of the screen are selected based on the frequency of use of the icons or the input control portions over an extended period of time.

Although the interface of the present embodiment displays only a single data table, such as D1 or D1A, the respective data tables D1 or D1A may be allocated to a plurality of users, such that each user can use their own special interface UI based on their own data table D1 or D1A.

Figure 13:
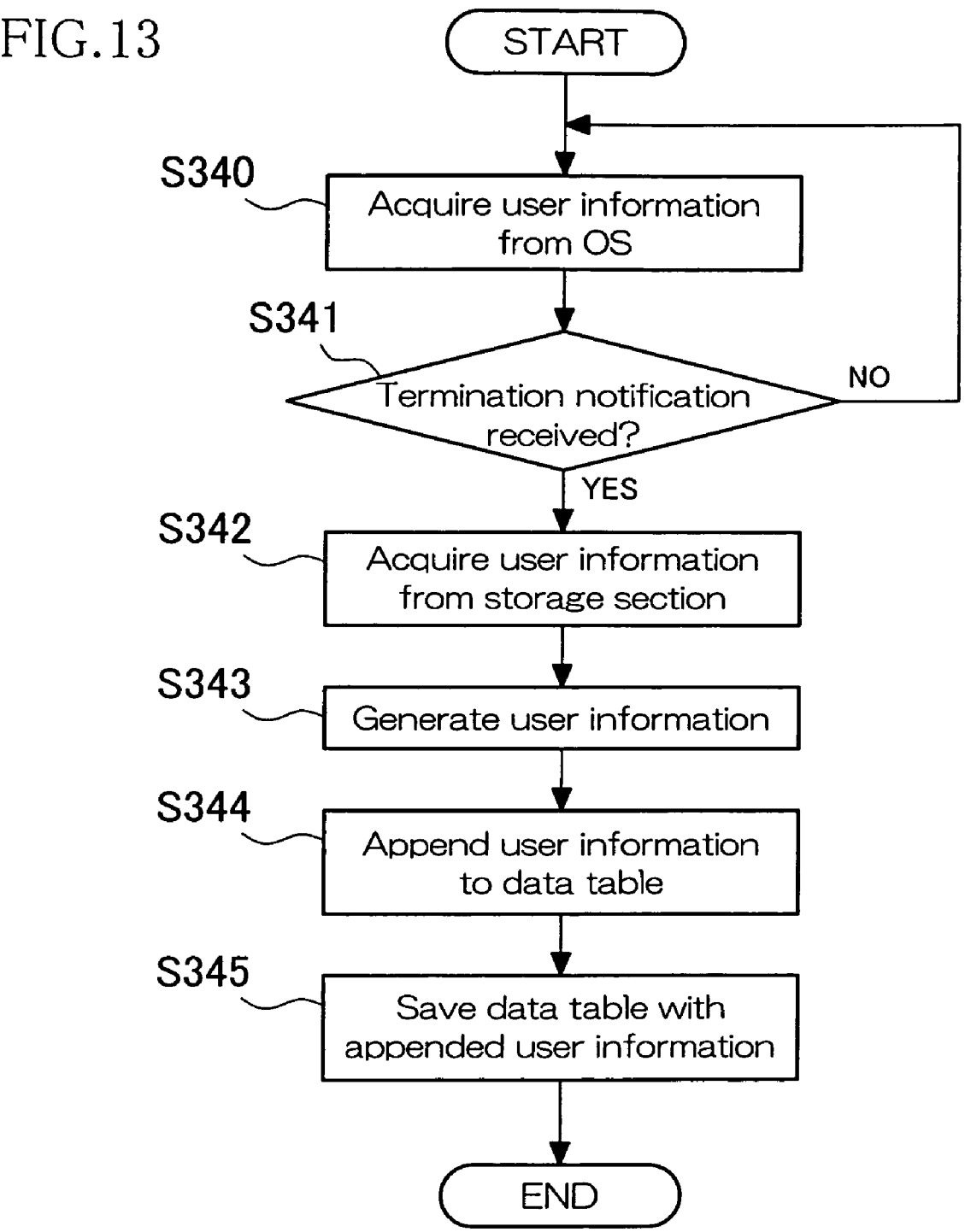
FIG. 13 is a flow chart illustrating a control procedure used for storing data tables for each user.

The control procedure used for storing such user-specific data tables will be now explained by referring to the flow chart of FIG. 13.

For instance, when the interface UI is displayed, the control section 3 asks the OS for an OS login name and administrator name and obtains and temporarily stores the login name and administrator name in the storage section 5 as user information (Step S340). Then, upon being notified of the termination of display of the interface UI by the application software 11 ("Yes" in Step S341), the control section 3 reads the user information from the storage section 5 (Step S342), encrypts the user information (Step S343), appends the encrypted user information to the data table D1A used for displaying the interface UI (Step S344), and stores the data table D1A in the HDD 34 via the storage section 5 (Step S345).

It should be noted that the encryption of the user information in Step S343 may be omitted.

Figures 14, 15:
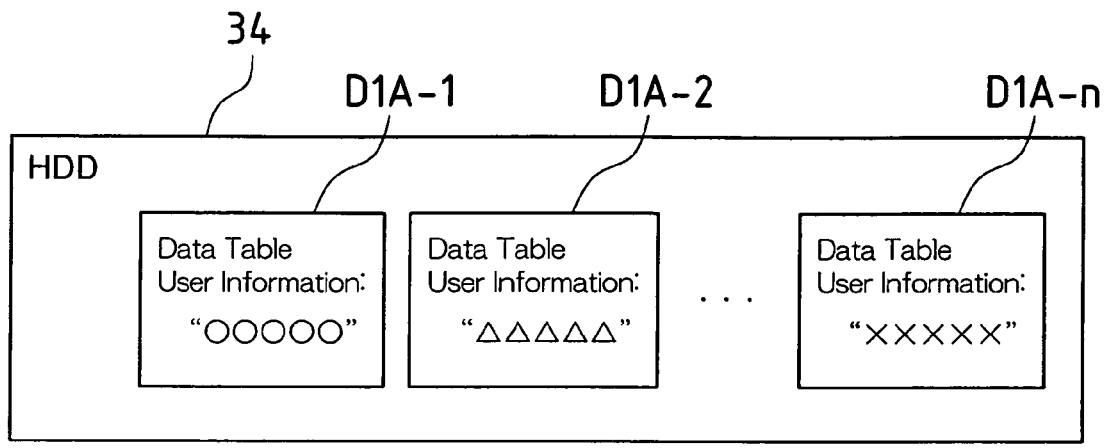
FIG. 14 is a diagram used for explaining the storage status of the data table of each user.
FIG. 15 is a diagram illustrating an example of another modification of the data table of FIG. 5.

Storing such data tables D1A with appended user information in the HDD 34 makes it possible to store data tables D1A-1, D1A-2, D1A-3 . . . for each user in the HDD 34, as shown in FIG. 14.

If user data tables D1A-1, D1A-2, D1A-3 . . . are stored in the HDD 34, the users can use their own special interfaces UI.

When notified of the commencement of display of the interface UI by the application software 11, the control section 3 requests and acquires user information from the OS. The control section 3 then accesses the HDD 34 via the storage section 5, decodes the user information of the data tables D1A-1, D1A-2, D1A-3 . . . , finds the same user information as the user information acquired from the OS, and searches the data table D1A, to which this user information is appended. The control section 3 then consults the data table D1A and displays a user-specific interface UI. At such time, as described above, it obtains a designated date and time preceding the current date and time by a designated period, obtains the frequency of selection of the icons or the input control portions since the designated date and time by consulting the data table D1A, selects the icons or the input control portions to be displayed in the display region B of the screen based on the frequency of selection, displays the selected icons or input control portions in the display region B, and displays the other icons or input control portions in the display region A of the screen.

Then, in the interface of the present embodiment, all of the icons or the input control portions corresponding to the display region A of the display region data are searched by consulting the data table D1 or D1A and all of these icons or input control portions are displayed in the display region A of the screen. For this reason, when the number of icons or input control portions displayed in the display region A increases, the period of display of moving the icons or the input control portions in the display region A becomes longer, resulting in decreased operability.

Therefore, the icons or the input control portions corresponding to the display region A of the display region data may be divided into groups, the groups may be specified, and the icons or the input control portions in the specified groups may be displayed in motion in the display region A of the screen. A different data table D1B, e.g. such as the one illustrated in FIG. 15, is used in such a case. In the same manner as the data table D1, the data table D1B stores, in a correlated form, identification numbers, display region data, image data of icon, and image data of input control portion, and, additionally, stores the names of the groups associated therewith.

Figure 16:
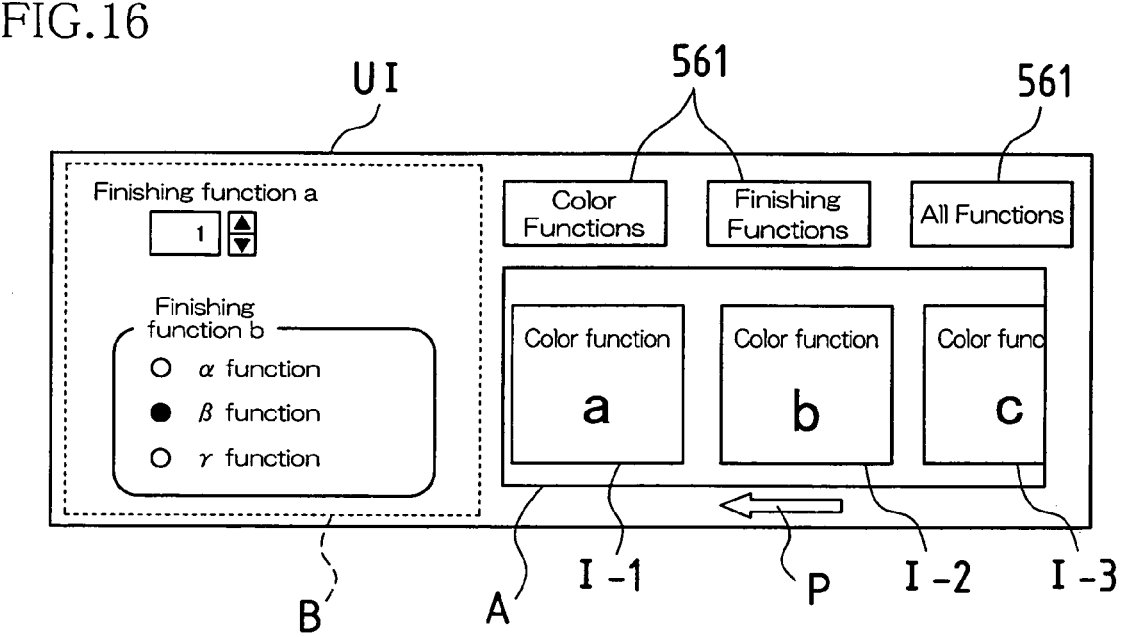
FIG. 16 is a diagram illustrating the interface UI used for displaying icons and input control portions displayed based on the data table of FIG. 15.

In addition, when the interface UI is displayed, buttons 561 are displayed for each group name, as illustrated in FIG. 16. In this state, when any of the buttons 561 is selected by an input operation using the pointing device 38, the display processing section 4 notifies the control section 3 of the group name corresponding to the selected button 561. When notified of the group name corresponding to the selected button 561, the control section 3 consults the data table D1 in the HDD 34 via the storage section 5, searches the display region A of the display region data and the group names, reads out a plurality of image data of the icon corresponding to the display region A and group names, and displays these image data of the icon in the display region A of the screen via the display processing section 4.

Figure 17:
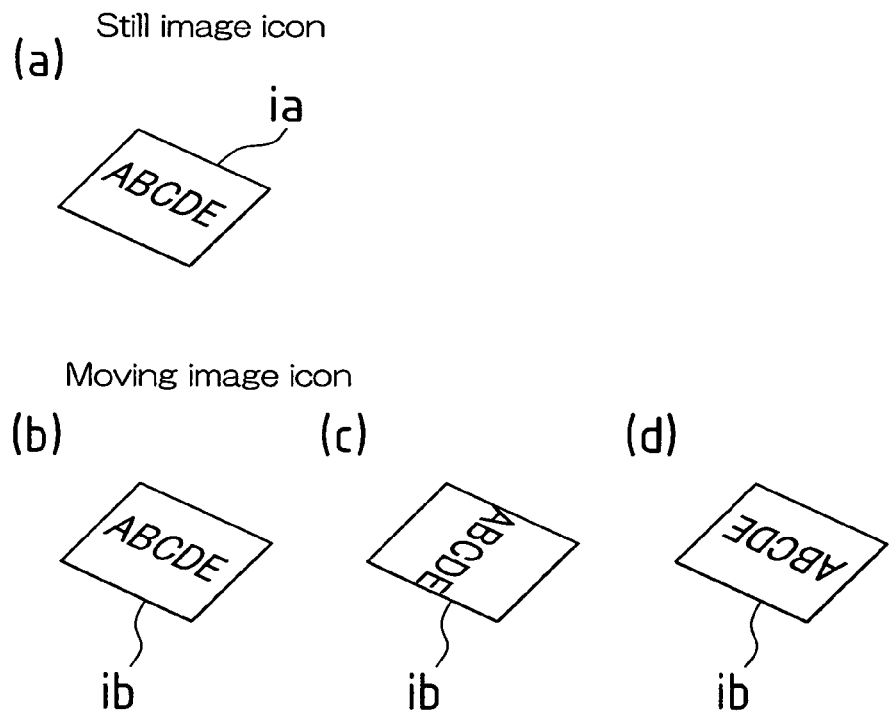
FIG. 17 (*a*) is a diagram illustrating a still image icon, and FIG. 17(*b*) through 17(*d*) are diagrams illustrating various frames of a moving icon.

In addition, although the interface of the present embodiment makes use of still images as the icons, moving images may be used as well. For instance, if a still image icon would be represented by the icon ia shown in FIG. 17(*a*), a moving icon would look like the icon ib, which is composed of a plurality of frames representing a motion pattern involving a rotating character string "ABCD", as shown in FIG. 17 (*b*) though FIG. 17 (*d*).

Furthermore, although the icons are displayed in motion across the display region A of the screen, instead of that, a cylinder can be displayed and multiple icons can be placed on the outer peripheral surface of the cylinder. The multiple icons can be then endlessly repeatedly displayed in motion by rotating the cylinder. Otherwise, instead of displaying the icons in motion, a plurality of icons may be changed and displayed in succession in a constant location.

In addition, easily recognizable input control portions may be displayed in the display region A of the screen instead of the icons, and icons may be displayed in the display region B of the screen instead of the input control portions.

The present invention may be embodied in various other forms without departing from the gist or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A computer comprising:
    a display device with a screen;
    an interface operatively connected with the screen, the screen displaying at least either of icons or input control portions respectively associated with each of a plurality of functions and, when one of the functions associated with one of the icons or the input control portions is selected by means of one of the icons or the input control portions displayed on the screen, reporting the selected function to a function processing section which activates the function,
    wherein the screen has a first display region displaying one or more of the icons and a second display region displaying one or more of the input control portions, and
    wherein the interface comprises display control means which allows the icons to be displayed in the first display region on the screen in a repeatedly changing manner by repeatedly moving each of the icons across the first display region automatically and which allows the input control portions to be displayed in the second display region on the screen on a permanent basis,
    wherein the display control means is capable of deleting the icons displayed in the repeatedly changing manner in the first display region so as to display, in the second display region, the input control portions associated with the same functions as the deleted icons, and deleting the input control portions displayed in the second display region so as to display, in the first display region, the icons associated with the same functions as the deleted input control portions in the repeatedly changing manner,
    wherein said deleting the icons and the input control portions is performed in response to a user selecting, from a displayed list of names of each of the plurality of functions, one or more checkboxes displayed in association with said names of the plurality of functions, to designate either the first display region or the second display region for one or more of the plurality of functions, and the display control means automatically determining in response to said selection, whether to display the associated icon in the first display region on the screen in the repeatedly changing manner or to display the associated input control portions in the second display region on the screen on a permanent basis for each of the plurality of functions by reading a data table that stores in correlated form identification numbers describing the plurality of functions, image data of the icons, image data of the input control portions, display region data describing the display regions as set by said user selection.

2. The computer according to claim 1, wherein the display control means allows both one of the icons and one of the input control portions associated with at least one of the plurality of functions to be displayed on the screen.

3. The computer according to claim 1, comprising selection means for selecting at least one mode of display for each function, the display mode being selected from permanent display of the input control portions or changing display of the icons.

4. The computer according to claim 1, wherein the interface comprises storage means for storing, for each displayed icon or input control portion, the frequency of selection obtained when the icon or the input control portion is selected and pointed in order to activate a function,
    wherein the display control means selects a permanently-displayed designated input control portion based on the frequency of selection of the icons or the input control portions stored in the storage means.

5. The computer according to claim 1, wherein the interface comprises number entry means for entering and pointing a number of permanently-displayed designated input control portions, and
    wherein the display control means permanently displays a number of designated input control portions based on the number entered and pointed by the number entry means.

6. The computer according to claim 1, wherein the interface comprises storage means for storing, for each icon or input control portion, the frequency of selection and the date and time of selection obtained when the icons or the input control portions are selected and pointed in order to activate a function,
    wherein the display control means, by using the frequency of selection and the date and time of selection of the icons or the input control portions stored in the storage means, designates a date and time to obtain the frequency of selection after the designated date and time for each icon or input control portion, and selects a permanently-displayed designated input control portion based on the frequency of selection of the icons or the input control portions after the designated date and time.

7. The computer according to claim 6, wherein the interface comprises date/time entry means for entering a designated date and time.

8. The computer according to claim 1, wherein the interface comprises storage means for storing the designated input control portions in association with user information,
    wherein the display control means acquires user information, reads an input control portion corresponding to the acquired user information as a designated input control portion from the storage means, and displays the read-out designated input control portion on a permanent basis.

9. The computer according to claim 1, wherein the interface comprises storage means for storing icons grouped, wherein the display control means reads out the icons corresponding to an entered and pointed group from the storage means and repeatedly changes and displays the read-out icons in succession.

10. The computer according to claim 1, wherein the icons or the input control portions are moving images.

* * * * *